United States Patent
Zhang

(10) Patent No.: US 12,388,545 B2
(45) Date of Patent: Aug. 12, 2025

(54) SELF-EXCITATION DETECTION METHOD FOR WIRELESS-SIGNAL RELAY AMPLIFICATION DEVICE, ELECTRONIC DEVICE, AND STORAGE MEDIUM

(71) Applicant: SPREADTRUM COMMUNICATIONS (SHANGHAI) CO., LTD., Shanghai (CN)

(72) Inventor: Yongsheng Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 398 days.

(21) Appl. No.: 18/040,212

(22) PCT Filed: Jul. 1, 2021

(86) PCT No.: PCT/CN2021/103955
§ 371 (c)(1),
(2) Date: Feb. 1, 2023

(87) PCT Pub. No.: WO2022/017151
PCT Pub. Date: Jan. 27, 2022

(65) Prior Publication Data
US 2023/0269011 A1 Aug. 24, 2023

(30) Foreign Application Priority Data
Jul. 23, 2020 (CN) .......................... 202010718186.X

(51) Int. Cl.
*H04B 17/40* (2015.01)
*H04B 17/318* (2015.01)

(52) U.S. Cl.
CPC ........... *H04B 17/40* (2015.01); *H04B 17/318* (2015.01)

(58) Field of Classification Search
CPC .............................. H04B 17/40; H04B 17/318
See application file for complete search history.

(56) References Cited

U.S. PATENT DOCUMENTS 4,594,584 A * 6/1986 Pfeiffer ............... G01F 23/2967
73/290 V
8,073,387 B2 * 12/2011 Maslennikov ..... H04B 7/15578
455/24

(Continued)

FOREIGN PATENT DOCUMENTS

| CN | 101599791 A | 12/2009 |
| CN | 102130698 A | 7/2011 |

(Continued)

OTHER PUBLICATIONS

WIPO, International Search Report and Written Opinion for International Application No. PCT/CN2021/103955, Aug. 30, 2021.

(Continued)

*Primary Examiner* — Hai V Nguyen
(74) *Attorney, Agent, or Firm* — HAUPTMAN HAM, LLP

(57) ABSTRACT

A self-excitation detection method for a wireless-signal relay amplification device, an electronic device, and a storage medium are provided. The wireless-signal relay amplification device includes a receiving side, a baseband side, and a transmitting side. The self-excitation detection method includes: when a wireless signal is received at the receiving side, turning off the transmitting side; determining whether a first input power of a wireless signal detected by the receiving side is the same as a second input power of a wireless signal detected by the baseband side and transmitted to the transmitting side by the receiving side; and determining whether self-excitation occurs according to the (Continued)

wireless signal detected by the baseband side, if the first input power is different from the second input power.

18 Claims, 4 Drawing Sheets

(56) References Cited

U.S. PATENT DOCUMENTS

| | | | | |
|---|---|---|---|---|
| 8,369,773 | B2* | 2/2013 | Li | H04B 17/40 370/293 |
| 2008/0293360 | A1* | 11/2008 | Maslennikov | H04B 7/15578 455/24 |
| 2012/0120988 | A1* | 5/2012 | Li | H04B 17/40 375/211 |

FOREIGN PATENT DOCUMENTS

| | | |
|---|---|---|
| CN | 105634629 A | 6/2016 |
| CN | 106301524 A | 1/2017 |
| CN | 107872284 A | 4/2018 |
| CN | 108288992 A | 7/2018 |
| CN | 109639335 A | 4/2019 |
| CN | 111163023 A | 5/2020 |
| KR | 20060111311 A | 10/2006 |
| WO | 2013063735 A1 | 5/2013 |

OTHER PUBLICATIONS

Analysis of the Influence of Narrowband Interference on CDMA Signal, Lei Zhang, Mar. 19, 2017.

Design of Antenna for High Isolation Same Frequency Repeater, Yipeng Fan, Mar. 2011.

Research on Correlation between WCDMA Fast Power Control and Repeater, Xiangzheng Xu, Nov. 2, 2006.

2011 International Conference on Advanced Power System Automation and Protection, Inertia Emulation Control of VSC-HVDC Transmission System, Jiebei Zhu et al., 2011.

The first office action issued in corresponding CN application No. 202010718186.X dated Dec. 23, 2021.

* cited by examiner

SELF-EXCITATION DETECTION METHOD FOR WIRELESS-SIGNAL RELAY AMPLIFICATION DEVICE, ELECTRONIC DEVICE, AND STORAGE MEDIUM

CROSS-REFERENCE TO RELATED APPLICATION(S)

This application is a National Stage of International Application No. PCT/CN2021/103955, filed Jul. 1, 2021, which claims priority to Chinese Patent Application No. 202010718186.X, filed Jul. 23, 2020, the entire disclosures of which are hereby incorporated by reference.

TECHNICAL FIELD

This application relates to the field of communication technology, and particularly to a self-excitation detection method for a wireless-signal relay amplification device, an electronic device, and a storage medium.

BACKGROUND

A wireless-signal relay amplification device (e.g., a wireless repeater) has a function of amplifying a received wireless signal and then transmitting the amplified wireless signal. During actual operation of the wireless-signal relay amplification device, part of a transmitted signal will be fed back to a receiving side of the wireless-signal relay amplification device and amplified again. In such a way, positive feedback is formed, a received signal strength indication (RSSI) control word calibrated by automatic gain control (AGC) at the receiving side keeps increasing until saturation, the gain is greater than an isolation degree, and self-excitation is generated.

During actual operation of the wireless-signal relay amplification device (e.g., a wireless repeater), a received power and an isolation degree will vary with the complex external environment, which is prone to cause self-excitation. For example, in a special environment such as an elevator car, a signal quality is relatively good when the elevator runs to higher floors, and the signal quality will be weakened when the elevator runs to lower floors, in this environment, it is prone to determine that a self-excitation state is entered. In addition, opening and closing of a door of the elevator car will lead to large change in the isolation degree, which is also prone to determine that a self-excitation state is entered.

Frequent determination of entering of the self-excitation state tends to lead to abnormal operation of the wireless-signal relay amplification device (e.g., a wireless repeater). A main reason for frequent determination of entering of the self-excitation state is that, in the related art, whether to enter the self-excitation state is determined only according to a comparison result between a received signal power and a signal power detected by a baseband side. Specifically, if the received signal power is consistent with the signal power detected by the baseband side, determine that the self-excitation state is not entered; conversely, if the received signal power is inconsistent with the signal power detected by the baseband side, determine that the self-excitation state is entered without judging on a self-excitation process.

SUMMARY

The disclosure provides a self-excitation detection method for a wireless-signal relay amplification device. The wireless-signal relay amplification device includes a receiving side, a baseband side, and a transmitting side. The self-excitation detection method includes: when a wireless signal is received at the receiving side, turning off the transmitting side; determining whether a first input power of a wireless signal detected by the receiving side is the same as a second input power of a wireless signal detected by the baseband side and transmitted to the transmitting side by the receiving side; and determining whether self-excitation occurs according to the wireless signal detected by the baseband side, in response to the first input power being different from the second input power.

The disclosure provides an electronic device. The electronic device is coupled with a wireless-signal relay amplification device including a receiving side, a baseband side, and a transmitting side. The electronic device includes a memory and a processor. The memory is coupled with the processor, and stores computer programs which are operable with the processor to: turn off the transmitting side when a wireless signal is received at the receiving side; determine whether a first input power of a wireless signal detected by the receiving side is the same as a second input power of a wireless signal detected by the baseband side and transmitted to the transmitting side by the receiving side; and determine whether self-excitation occurs according to the wireless signal detected by the baseband side, in response to the first input power being different from the second input power.

The disclosure provides a non-transitory computer-readable storage medium. The non-transitory computer-readable storage medium stores computer programs which, when executed by a processor, cause the processor to carry out the following actions: turning off a transmitting side of a wireless-signal relay amplification device when a wireless signal is received at a receiving side of the wireless-signal relay amplification device; determining whether a first input power of a wireless signal detected by the receiving side is the same as a second input power of a wireless signal detected by a baseband side of the wireless-signal relay amplification device and transmitted to the transmitting side by the receiving side; and determining whether self-excitation occurs according to the wireless signal detected by the baseband side, in response to the first input power being different from the second input power.

DETAILED DESCRIPTION

Hereinafter, the disclosure will be further depicted with reference to implementations, and these implementations, however, are not intended to limit the disclosure.

First Implementation

The implementation provides a self-excitation detection method for a wireless-signal relay amplification device. The wireless-signal relay amplification device, for example, is a repeater, a microchamber, etc. Specifically, the wireless-signal relay amplification device includes a receiving side, a baseband side, and a transmitting side. Further, the self-excitation detection method of this implementation may be applied to the baseband side.

Figure 1:
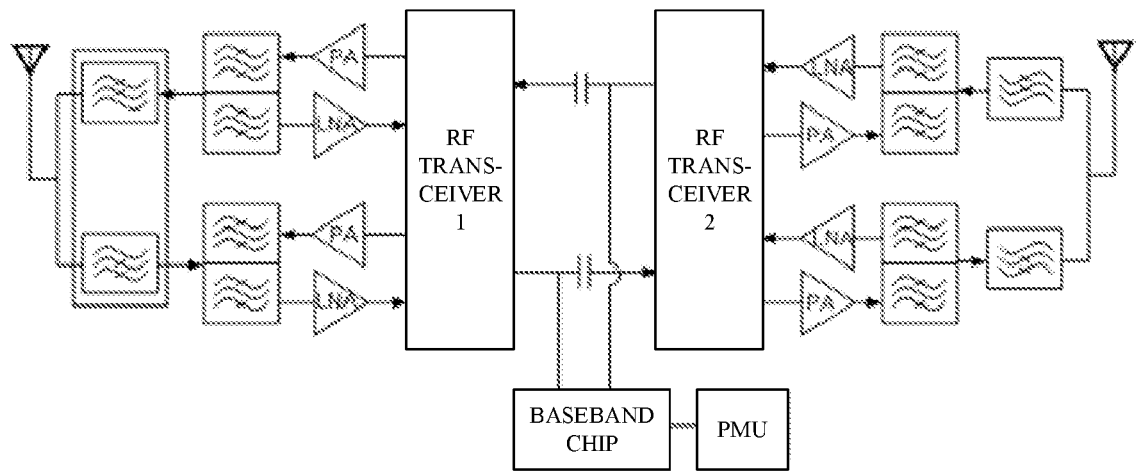
FIG. 1 is a principle diagram of a wireless-signal relay amplification device to which a self-excitation detection method is applicable according to a first implementation of the disclosure.

Specifically, referring to FIG. 1, a main path of the wireless-signal relay amplification device of this implementation includes two cascaded radio frequency (RF) transceiver modules. The RF transceiver modules each are configured with two sets of loops composed of a power amplifier (PA) and a low noise amplifier (LNA). The baseband side includes a baseband chip and a power management unit (PMU). In this implementation, an RF transceiver module for receiving a wireless signal is referred to as a receiving side, and an RF transceiver module for transmitting a wireless signal is referred to as a transmitting side.

Figure 2:
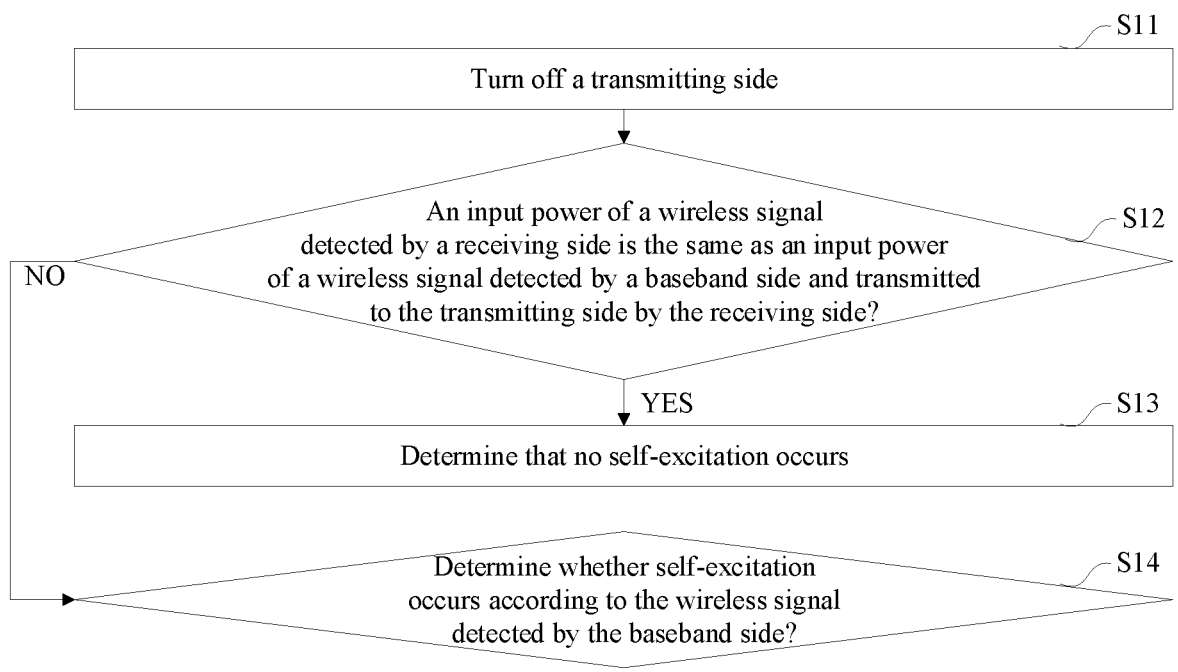
FIG. 2 is a schematic flowchart illustrating the self-excitation detection method for the wireless-signal relay amplification device according to the first implementation of the disclosure.

When a wireless signal is received at the receiving side, referring to FIG. 2, the self-excitation detection method of this implementation includes the following.

At S11, turn off the transmitting side.

At S12, determine whether an input power of a wireless signal detected by the receiving side is the same as an input power of a wireless signal detected by the baseband side and transmitted to the transmitting side by the receiving side.

If the input power of the wireless signal detected by the receiving side is the same as the input power of the wireless signal detected by the baseband side and transmitted to the transmitting side by the receiving side (YES), the method proceeds to S13. Conversely, if the input power of the wireless signal detected by the receiving side is different from the input power of the wireless signal detected by the baseband side and transmitted to the transmitting side by the receiving side (NO), the method proceeds to S14.

At S13, determine that no self-excitation occurs.

At S14, determine whether self-excitation occurs according to the wireless signal detected by the baseband side.

Figure 3:
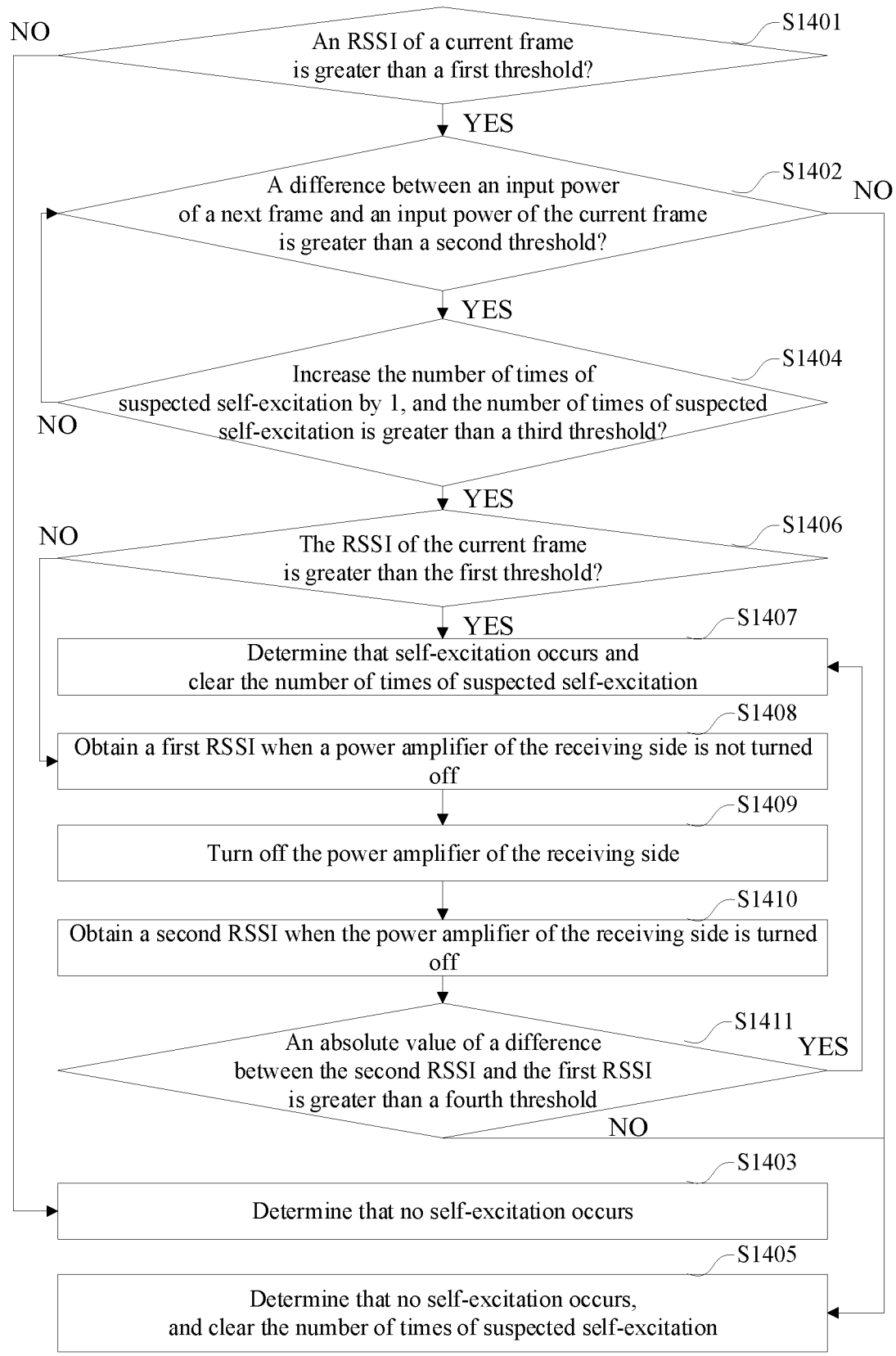
FIG. 3 is a schematic flowchart illustrating operations at S14 of the self-excitation detection method for the wireless-signal relay amplification device according to the first implementation of the disclosure.

In this implementation, if the result of S12 is NO, the wireless-signal relay amplification device is suspected of self-excitation. However, in this implementation, it is not directly determined that self-excitation occurs to the wireless-signal relay amplification device, but whether self-excitation occurs to the wireless-signal relay amplification device is further determined according to the wireless signal detected by the baseband side. Referring to FIG. 3, the operations at S14 of this implementation specifically include the following.

At S1401, determine whether a received signal strength indication (RSSI) of a current frame is greater than a first threshold.

If the result of S1401 is yes, operations at S1402 are executed. Otherwise, the method proceeds to S1403.

At S1402, determine whether a difference between an input power of a next frame and an input power of the current frame is greater than a second threshold.

If the result of S1402 is yes, operations at S1404 are executed. Otherwise, operations at S1405 are executed.

At S1404, increase the number of times of suspected self-excitation by 1 and determine whether the number of times of suspected self-excitation is greater than a third threshold.

If the result of S1404 is yes, operations at S1406 are executed. Otherwise, the method proceeds to operations at S1402.

At S1406, determine whether the RSSI of the current frame is greater than the first threshold.

If the result of S1406 is yes, operations at S1407 are executed. Otherwise, the method proceeds to operations at S1408.

At S1407, determine that self-excitation occurs and clear the number of times of suspected self-excitation.

At S1403, determine that no self-excitation occurs and proceed to operations at S1401.

At S1405, determine that no self-excitation occurs, clear the number of times of suspected self-excitation, and proceed to operations at S1401.

At S1408, obtain a first RSSI when a power amplifier of the receiving side is not turned off.

At S1409, turn off the power amplifier of the receiving side.

At S1410, obtain a second RSSI when the power amplifier of the receiving side is turned off.

At S1411, determine whether an absolute value of a difference between the second RSSI and the first RSSI is greater than a fourth threshold.

If the result of S1411 is yes, operations at S1407 are executed. Otherwise, operations at S1405 are executed.

In this implementation, the first threshold may be customized according to actual application. For example, the first threshold may be set to a maximum threshold of a calibrated control word (e.g., 1000). If the result of S1401 is yes, the wireless-signal relay amplification device is suspected of self-excitation, and subsequent operations are executed. If the result of S1401 is no, determine that no self-excitation occurs to the wireless-signal relay amplification device, and the transmitting side is turned on to maintain the wireless-signal relay amplification device in a normal forwarding state.

In this implementation, when operations at S1402 are executed for the first time, for example, the input power of the current frame is P0, the input power of the next frame is P1, and the difference is P1-P0. When the operations at S1402 are executed again if the result of S1402 is yes and the result of S1404 is no, the input power of the current frame is P1, the input power of the next frame is P2, and the difference is P2-P1. In this implementation, the second threshold may be customized according to actual application. For example, the second threshold may be set to a rated power (e.g., 13 dbm) of the wireless-signal relay amplification device. If the result of S1402 is yes, the wireless-signal relay amplification device is suspected of self-excitation, and subsequent operations are executed. If the result of S1402 is no, determine that no self-excitation occurs to the wireless-signal relay amplification device, and the transmitting side is turned on to maintain the wireless-signal relay amplification device in a normal forwarding state.

In this implementation, the initial value of the number of times of suspected self-excitation is 0. The third threshold may be customized according to actual application. For example, the third threshold is 3.

In this implementation, if the result of S1406 is yes, determine that self-excitation occurs to the wireless-signal relay amplification device, and the wireless-signal relay amplification device performs self-excitation processing (e.g., restart, gain adjustment, etc.). If the result of S1406 is no, the wireless-signal relay amplification device is highly suspected of self-excitation. In this implementation, a state of the wireless-signal relay amplification device in this situation can be marked as a suspected self-excitation state, and the operations at S1408-S1411 are performed for further determination.

In this implementation, the fourth threshold may be customized according to actual application. Specifically, if the result of S1411 is yes, on/off of a power amplifier causes large change in RSSI, determine that self-excitation occurs to the wireless-signal relay amplification device, and the wireless-signal relay amplification device performs self-excitation processing. If the result of S1411 is no, the on/off of the power amplifier causes no change or small change in RSSI, determine that no self-excitation occurs to the wireless-signal relay amplification device, and the transmitting side is turned on to maintain the wireless-signal relay amplification device in a normal forwarding state.

In this implementation, the receiving side includes, for example, an outdoor antenna for communicating with a base station, and the transmitting side includes, for example, an indoor antenna for communicating with a user terminal. Specifically, in this implementation, a downlink receiving side receives a signal from a base station, the signal enters a baseband, the baseband is synchronized with and resides in an appropriate cell, and the transmitting side is turned on to amplify the signal and send the amplified signal into the room when no self-excitation occurs. A signal from the user terminal can also be amplified by the wireless-signal relay amplification device and then transmitted outward. Moreover, while forwarding the amplified signal, the baseband will perform frequency tracking and power control according to the received signal.

In this implementation, whether self-excitation occurs to the wireless-signal relay amplification device is determined based on a process, the misjudgment that the wireless-signal relay amplification device enters a self-excitation state, which is caused by continuous change of a received power and an isolation degree, can be reduced, so that the wireless-signal relay amplification device can be in a normal forwarding state when an external environment changes, which is beneficial to improving a quality of the wireless-signal relay amplification device and improving a user experience.

In addition, this implementation can be applied to wireless signals of different standards (e.g., LTE, WCDMA, etc.), and the transmitting side is turned on to forward the wireless signal only when it is determined that no self-excitation occurs. Furthermore, in this implementation, the self-excitation detection is realized through the circuits of the wireless-signal relay amplification device without introducing additional hardware, which is beneficial to reducing the cost.

Second Implementation

The implementation provides a self-excitation detection system for a wireless-signal relay amplification device. The wireless-signal relay amplification device, for example, is a repeater, a microchamber, etc. Specifically, the wireless-signal relay amplification device includes a receiving side, a baseband side, and a transmitting side. Further, the self-excitation detection system of this implementation may be applied to the baseband side.

Specifically, referring to FIG. 2, a main path of the wireless-signal relay amplification device of this implementation includes two cascaded RF transceiver modules. The RF transceiver modules each are configured with two sets of loops composed of a PA and a LNA. The baseband side includes a baseband chip and a PMU. In this implementation, an RF transceiver module for receiving a wireless signal is referred to as a receiving side, and an RF transceiver module for transmitting a wireless signal is referred to as a transmitting side.

Figure 4:
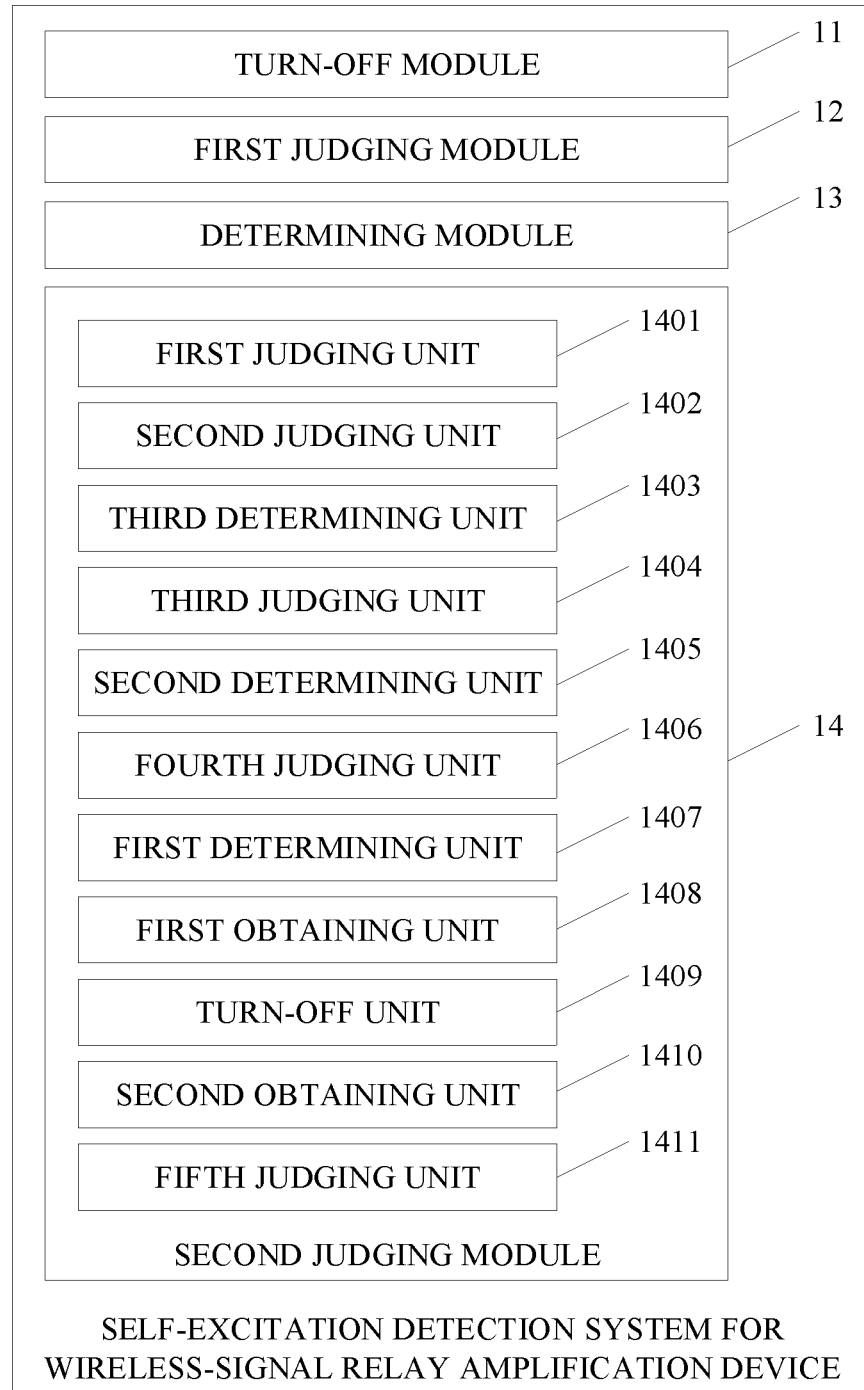
FIG. 4 is a block diagram illustrating a self-excitation detection system for a wireless-signal relay amplification device according to a second implementation of the disclosure.

When a wireless signal is received at the receiving side, referring to FIG. 4, the self-excitation detection system of this implementation includes a turn-off module 11, a first judging module 12, a determining module 13, and a second judging module 14. The turn-off module 11 is configured to turn off the transmitting side when a wireless signal is received at the receiving side. The first judging module 12 is configured to determine whether an input power of a wireless signal detected by the receiving side is the same as an input power of a wireless signal detected by the baseband side and transmitted to the transmitting side by the receiving side, after the turn-off module 11 is called. If yes, the determining module 13 is called. Conversely, if no, the second judging module 14 is called. The determining module 13 is configured to determine that no self-excitation occurs. The second judging module 14 is configured to determine whether self-excitation occurs according to the wireless signal detected by the baseband side.

In this implementation, if the first judging module 12 determines no, the wireless-signal relay amplification device is suspected of self-excitation. However, in this implementation, it is not directly determined that self-excitation occurs to the wireless-signal relay amplification device, but whether self-excitation occurs to the wireless-signal relay amplification device is further determined according to the wireless signal detected by the baseband side. Referring to FIG. 4, the second judging module 14 of this implementation specifically includes a first judging unit 1401, a second judging unit 1402, a third judging unit 1404, a fourth judging unit 1406, a first determining unit 1407, a second determining unit 1405, a third determining unit 1403, a first obtaining unit 1408, a turn-off unit 1409, a second obtaining unit 1410, and a fifth judging unit 1411. The first judging unit 1401 is configured to determine whether an RSSI of a current frame is greater than a first threshold. If yes, the second judging unit 1402 is called. Conversely, if no, the third determining unit 1403 is called. The second judging unit 1402 is configured to determine whether a difference between an input power of a next frame and an input power of the current frame is greater than a second threshold. If yes, the third judging unit 1404 is called. Conversely, if no, the second determining unit 1405 is called. The third judging unit 1404 is configured to increase the number of times of suspected self-excitation by 1 and determine whether the number of times of suspected self-excitation is greater than a third threshold. If yes, the fourth judging unit 1406 is called. Conversely, if no, the second judging unit 1402 is called. The fourth judging unit 1406 is configured to determine whether the RSSI of the current frame is greater than the first threshold. If yes, the first determining unit 1407 is called. Conversely, if no, the first obtaining unit 1408 is called. The first determining unit 1407 is configured to determine that self-excitation occurs and clear the number of times of suspected self-excitation. The third determining unit 1403 is configured to determine that no self-excitation occurs and call the first judging unit 1401. The second determining unit 1405 is configured to determine that no self-excitation occurs, clear the number of times of suspected self-excitation, and call the first judging unit 1401. The first obtaining unit 1408 is configured to obtain a first RSSI when a power amplifier of the receiving side is not turned off. The turn-off unit 1409 is configured to turn off the power amplifier of the receiving side. The second obtaining unit 1410 is configured to obtain a second RSSI when the power amplifier of the receiving side is turned off. The fifth judging unit 1411 is configured to determine whether an absolute value of a difference between the second RSSI and the first RSSI is greater than a fourth threshold. If yes, the first determining unit 1407 is called. Conversely, if no, the second determining unit 1405 is called.

In this implementation, the first threshold may be customized according to actual application. For example, the first threshold may be set to a maximum threshold of a calibrated control word (e.g., 1000). If the first judging unit 1401 determines yes, the wireless-signal relay amplification device is suspected of self-excitation, and other units are called. If the first judging unit 1401 determines no, determine that no self-excitation occurs to the wireless-signal relay amplification device, and the transmitting side is turned on to maintain the wireless-signal relay amplification device in a normal forwarding state.

In this implementation, when the second judging unit 1402 is called for the first time, for example, the input power of the current frame is P0, the input power of the next frame is P1, and the difference is P1-P0. When the second judging unit 1402 is called again if the second judging unit 1402 determines yes and the third judging unit 1404 determines no, the input power of the current frame is P1, the input power of the next frame is P2, and the difference is P2-P1. In this implementation, the second threshold may be customized according to actual application. For example, the second threshold may be set to a rated power (e.g., 13 dbm) of the wireless-signal relay amplification device. If the second judging unit 1402 determines yes, the wireless-signal relay amplification device is suspected of self-excitation, and other units are called. If the second judging unit 1402 determines no, determine that no self-excitation occurs to the wireless-signal relay amplification device, and the transmitting side is turned on to maintain the wireless-signal relay amplification device in a normal forwarding state.

In this implementation, the initial value of the number of times of suspected self-excitation is 0. The third threshold may be customized according to actual application. For example, the third threshold is 3.

In this implementation, if the fourth judging unit 1406 determines yes, determine that self-excitation occurs to the wireless-signal relay amplification device, and the wireless-signal relay amplification device performs self-excitation processing (e.g., restart, gain adjustment, etc.). If the fourth judging unit 1406 determines no, the wireless-signal relay amplification device is highly suspected of self-excitation. In this implementation, a state of the wireless-signal relay amplification device in this situation can be marked as a suspected self-excitation state, and the first obtaining unit 1408, the turn-off unit 1409, the second obtaining unit 1410, and the fifth judging unit 1411 are called for further determination.

In this implementation, the fourth threshold may be customized according to actual application. Specifically, if the fifth judging unit 1411 determines yes, on/off of a power amplifier causes large change in RSSI, and it is determined that self-excitation occurs to the wireless-signal relay amplification device, and the wireless-signal relay amplification device performs self-excitation processing. If the fifth judging unit 1411 determines no, the on/off of the power amplifier causes no change or small change in RSSI, it is determined that no self-excitation occurs to the wireless-signal relay amplification device, and the transmitting side is turned on to maintain the wireless-signal relay amplification device in a normal forwarding state.

In this implementation, the receiving side includes, for example, an outdoor antenna for communicating with a base station, and the transmitting side includes, for example, an indoor antenna for communicating with a user terminal. Specifically, in this implementation, a downlink receiving side receives a signal from a base station, the signal enters a baseband, the baseband is synchronized with and resides in an appropriate cell, and the transmitting side is turned on to amplify the signal and send the amplified signal into the room when no self-excitation occurs. A signal from the user terminal can also be amplified by the wireless-signal relay amplification device and then transmitted outward. Moreover, while forwarding the amplified signal, the baseband will perform frequency tracking and power control according to the received signal.

In this implementation, whether self-excitation occurs to the wireless-signal relay amplification device is determined based on a process, the misjudgment that the wireless-signal relay amplification device enters a self-excitation state, which is caused by continuous change of a received power and an isolation degree, can be reduced, so that the wireless-signal relay amplification device can be in a normal forwarding state when an external environment changes, which is beneficial to improving a quality of the wireless-signal relay amplification device and improving a user experience.

In addition, this implementation can be applied to wireless signals of different standards (e.g., LTE, WCDMA, etc.), and the transmitting side is turned on to forward the wireless signal only when it is determined that no self-excitation occurs. Furthermore, in this implementation, the self-excitation detection is realized through the circuits of the wireless-signal relay amplification device, without introducing additional hardware, which is beneficial to reducing the cost.

Third Implementation

The implementation provides an electronic device. The electronic device may be represented in a form of a computing device (e.g., a server device), and may include a memory, a processor, and computer programs stored in the memory and run on the processor. The computer programs, when executed by the processor, are operable to execute the self-excitation detection method for the wireless-signal relay amplification device of the first implementation. It should be noted that, the electronic device may be coupled with the wireless-signal relay amplification device, or may be integrated with the wireless-signal relay amplification device as part of the wireless-signal relay amplification device. The connection may be wired connection, wireless connection, electrical connection, etc.

Figure 5:
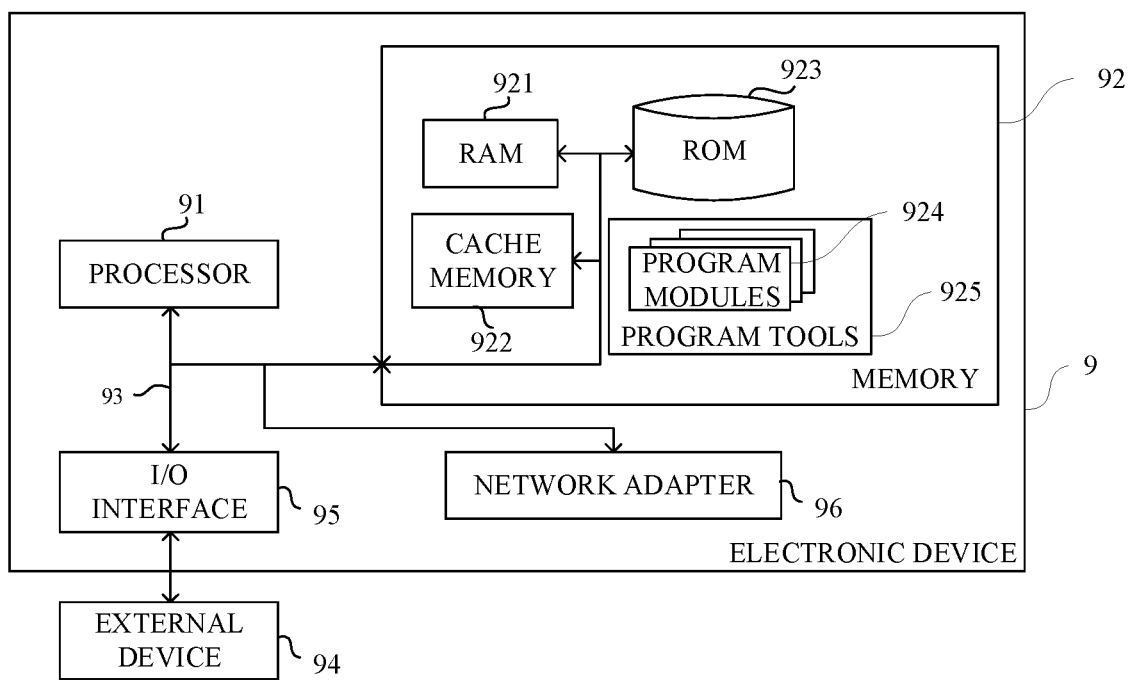
FIG. 5 is a schematic structural diagram illustrating an electronic device according to a third implementation of the disclosure.

FIG. 5 illustrates a schematic diagram of a hardware structure of this implementation. As illustrated in FIG. 5, an electronic device 9 includes at least one processor 91, at least one memory 92, and a bus 93 for connecting different system components (including the processor 91 and the memory 92). The bus 93 may include a data bus, an address bus, and a control bus. The memory 92 may include a transitory memory such as a random access memory (RAM) 921 and/or a cache memory 922, and may further include a non-transitory memory such as a read-only memory (ROM) 923. The memory 92 further includes a program/program tools 925 having a set (at least one) of program modules 924, and such program module 924 includes, but is not limited to, an operating system, one or more applications, other program modules and program data, each of these examples or some combination of these examples may include implementation of a network environment. The processor 91 can execute various functional applications and data processing by running computer programs stored in the memory 92, such as the self-excitation detection method for the wireless-signal relay amplification device of the first implementation of the disclosure.

The electronic device 9 may further communicate with one or more external devices 94 (e.g. a keyboard, a pointing device, etc.). Such communication may be performed through an input/output (I/O) interface 95. The electronic device 9 may also communicate with one or more networks (e.g. a local area network (LAN), a wide area network (WAN), and/or a public network such as the Internet) through a network adapter 96. The network adapter 96 communicates with other modules of the electronic device 9 through the bus 93. It should be appreciated that, although not illustrated in the figure, other hardware and/or software modules may be used in conjunction with the electronic device 9, including but not limited to: microcode, device drivers, redundant processors, external disk drive arrays, redundant array of independent disks (RAID) systems, tape drives, and data backup storage systems, etc.

It should be noted that, although several units/modules or sub-units/modules of the electronic device are mentioned in the above detailed description, such division is merely exemplary and not mandatory. In fact, according to implementations of the disclosure, the features and functions of the two or more units/modules described above may be embodied in one unit/module. Conversely, the features and functions of one unit/module described above may be further partitioned to be embodied as multiple units/modules.

Fourth Implementation

The implementation provides a computer-readable storage medium. The computer-readable storage medium stores computer programs. The computer programs, when executed by a processor, are operable to execute the operations of the self-excitation detection method for the wireless-signal relay amplification device of the first implementation.

Specifically, the readable storage medium may include, but is not limited to, a portable disk, a hard disk, an RAM, an ROM, an erasable programmable ROM, an optical storage device, a magnetic storage device, or any suitable combination of the above.

In a possible implementation, the disclosure may also be implemented in a form of a program product. The program product includes program codes. When the program product is run on a terminal device, the program codes cause the terminal device to execute the operations of the self-excitation detection method for the wireless-signal relay amplification device of the first implementation.

The program codes for implementing the disclosure may be written in any combination of one or more programming languages. The program codes may be executed entirely on user equipment, executed partly on the user equipment, executed as a separate software package, executed partly on the user equipment and partly on a remote device, or executed entirely on the remote device.

The disclosure provides a self-excitation detection method and system for a wireless-signal relay amplification device, an electronic device, and a storage medium, which aims to solve a technical problem in the related art of determining whether to enter a self-excitation state only according to a comparison result between a received signal power and a signal power detected by a baseband side.

In the disclosure, the above technical problem is solved through the following technical solutions.

The disclosure provides a self-excitation detection method for a wireless-signal relay amplification device. The wireless-signal relay amplification device includes a receiving side, a baseband side, and a transmitting side. The self-excitation detection method includes: when a wireless signal is received at the receiving side, turning off the transmitting side; determining whether a first input power of a wireless signal detected by the receiving side is the same as a second input power of a wireless signal detected by the baseband side and transmitted to the transmitting side by the receiving side; and determining whether self-excitation occurs according to the wireless signal detected by the baseband side, in response to the first input power being different from the second input power.

Optionally, determining whether self-excitation occurs according to the wireless signal detected by the baseband side includes: determining whether an RSSI of a current frame is greater than a first threshold; determining whether a difference between an input power of a next frame and an input power of the current frame is greater than a second threshold, in response to the RSSI of the current frame being greater than the first threshold; increasing the number of times of suspected self-excitation by 1 and determining whether the number of times of suspected self-excitation is greater than a third threshold, in response to the difference being greater than the second threshold, wherein an initial value of the number of times of suspected self-excitation is 0; determining whether the RSSI of the current frame is greater than the first threshold, in response to the number of times of suspected self-excitation being greater than the third threshold; determining that self-excitation occurs and clearing the number of times of suspected self-excitation, in response to the number of times of suspected self-excitation being greater than the third threshold and the RSSI of the current frame being greater than the first threshold; determining that no self-excitation occurs, clearing the number of times of suspected self-excitation, and proceeding to determining whether the RSSI of the current frame is greater than the first threshold, in response to the difference being less than or equal to the second threshold; and proceeding to determining whether the difference between the input power of the next frame and the input power of the current frame is greater than the second threshold, in response to the number of times of suspected self-excitation being less than or equal to the third threshold.

Optionally, in response to the number of times of suspected self-excitation being greater than the third threshold and the RSSI of the current frame being less than or equal to the first threshold, the self-excitation detection method further includes: obtaining a first RSSI when a power amplifier of the receiving side is not turned off; turning off the power amplifier of the receiving side; obtaining a second RSSI when the power amplifier of the receiving side is turned off; determining whether an absolute value of a difference between the second RSSI and the first RSSI is greater than a fourth threshold; determining that self-excitation occurs and clearing the number of times of suspected self-excitation, in response to the absolute value of the difference being greater than the fourth threshold; and determining that no self-excitation occurs, clearing the number of times of suspected self-excitation, and proceeding to determining whether the RSSI of the current frame is greater than the first threshold, in response to the absolute value of the difference being less than or equal to the fourth threshold.

Optionally, based on a determination that no self-excitation occurs, the self-excitation detection method further includes: turning on the transmitting side.

Optionally, the receiving side includes an outdoor antenna, and the transmitting side includes an indoor antenna.

Optionally, the wireless-signal relay amplification device includes at least one of a repeater and a microchamber.

The disclosure provides a self-excitation detection system for a wireless-signal relay amplification device. The wireless-signal relay amplification device includes a receiving side, a baseband side, and a transmitting side. The self-excitation detection system includes a turn-off module, a first judging module, and a second judging module. The turn-off module is configured to turn off the transmitting side when a wireless signal is received at the receiving side. The first judging module is configured to determine whether an input power of a wireless signal detected by the receiving side is the same as an input power of a wireless signal detected by the baseband side and transmitted to the transmitting side by the receiving side, after the turn-off module is called. The second judging module is configured to determine whether self-excitation occurs according to the wireless signal detected by the baseband side, in response to the input power of the wireless signal detected by the receiving side being different from the input power of the wireless signal detected by the baseband side and transmitted to the transmitting side by the receiving side.

Optionally, the second judging module includes a first judging unit, a second judging unit, a third judging unit, a fourth judging unit, a first determining unit, and a second determining unit. The first judging unit is configured to determine whether an RSSI of a current frame is greater than a first threshold. The second judging unit is configured to determine whether a difference between an input power of a next frame and an input power of the current frame is greater than a second threshold, in response to the first judging unit determining that the RSSI of the current frame is greater than the first threshold. The third judging unit is configured to increase the number of times of suspected self-excitation by 1 and determine whether the number of times of suspected self-excitation is greater than a third threshold, in response to the second judging unit determining that the difference is greater than the second threshold, wherein an initial value of the number of times of suspected self-excitation is 0. The fourth judging unit is configured to further determine whether the RSSI of the current frame is greater than the first threshold, in response to the third judging unit determining that the number of times of suspected self-excitation is greater than the third threshold. The first determining unit is configured to determine that self-excitation occurs and clear the number of times of suspected self-excitation, in response to the fourth judging unit determining that the RSSI of the current frame is greater than the first threshold. The second determining unit is configured to determine that no self-excitation occurs, clear the number of times of suspected self-excitation, and call the first judging unit, in response to the second judging unit determining that the difference is less than or equal to the second threshold. The second judging unit is called in response to the third judging unit determining that the number of times of suspected self-excitation is less than or equal to the third threshold.

Optionally, the second judging module further includes a first obtaining unit, a turn-off unit, a second obtaining unit, and a fifth judging unit. The first obtaining unit is configured to obtain a first RSSI when a power amplifier of the receiving side is not turned off, in response to the fourth judging unit determining that the RSSI of the current frame is less than or equal to the first threshold. The turn-off unit is configured to turn off the power amplifier of the receiving side, after the first obtaining unit is called. The second obtaining unit is configured to obtain a second RSSI when the power amplifier of the receiving side is turned off. The fifth judging unit is configured to determine whether an absolute value of a difference between the second RSSI and the first RSSI is greater than a fourth threshold. The first determining unit is called in response to the absolute value of the difference being greater than the fourth threshold. The second determining unit is called in response to the absolute value of the difference being less than or equal to the fourth threshold.

Optionally, the self-excitation detection system further includes a turn-on module. The turn-on module is configured to turn on the transmitting side based on a determination that no self-excitation occurs.

Optionally, the receiving side includes an outdoor antenna, and the transmitting side includes an indoor antenna.

Optionally, the wireless-signal relay amplification device includes at least one of a repeater and a microchamber.

The disclosure provides an electronic device. The electronic device is coupled with a wireless-signal relay amplification device including a receiving side, a baseband side, and a transmitting side. The electronic device includes a memory and a processor. The memory is coupled with the processor, and stores computer programs which are operable with the processor to execute the above self-excitation detection method for the wireless-signal relay amplification device.

The disclosure provides a non-transitory computer-readable storage medium. The non-transitory computer-readable storage medium stores computer programs which, when executed by a processor, cause the processor to execute the operations of the above self-excitation detection method for the wireless-signal relay amplification device.

Advantageous effects of the disclosure resides in that: in the disclosure, whether self-excitation occurs to the wireless-signal relay amplification device is determined based on a process, the misjudgment that the wireless-signal relay amplification device enters a self-excitation state, which is caused by continuous change of a received power and an isolation degree, can be reduced, so that the wireless-signal relay amplification device can be in a normal forwarding state when an external environment changes, which is beneficial to improving a quality of the wireless-signal relay amplification device and improving a user experience.

While specific implementations of the disclosure have been depicted above, it will be understood by those skilled in the art that the above implementations are illustrative merely, and the scope of the disclosure is defined by the appended claims. Various changes and modifications may be made by those skilled in the art without departing from the principle and spirit of the disclosure, and such changes and modifications, however, shall all be encompassed within the protection scope of the disclosure.

What is claimed is:
1. A self-excitation detection method for a wireless-signal relay amplification device, the wireless-signal relay ampli- fication device comprising a receiving side, a baseband side, and a transmitting side, the self-excitation detection method comprising:
    turning off the transmitting side when a wireless signal is received at the receiving side;
    determining whether a first input power of a wireless signal detected by the receiving side is the same as a second input power of a wireless signal detected by the baseband side and transmitted to the transmitting side by the receiving side; and
    determining whether self-excitation occurs according to the wireless signal detected by the baseband side, in response to the first input power being different from the second input power.

2. The self-excitation detection method of claim 1, wherein determining whether self-excitation occurs according to the wireless signal detected by the baseband side comprises:
    determining whether a received signal strength indication (RSSI) of a current frame is greater than a first threshold;
    determining whether a difference between an input power of a next frame and an input power of the current frame is greater than a second threshold, in response to the RSSI of the current frame being greater than the first threshold;
    increasing the number of times of suspected self-excitation by 1 and determining whether the number of times of suspected self-excitation is greater than a third threshold, in response to the difference being greater than the second threshold, wherein an initial value of the number of times of suspected self-excitation is 0;
    determining whether the RSSI of the current frame is greater than the first threshold, in response to the number of times of suspected self-excitation being greater than the third threshold;
    determining that self-excitation occurs and clearing the number of times of suspected self-excitation, in response to the number of times of suspected self-excitation being greater than the third threshold and the RSSI of the current frame being greater than the first threshold;
    determining that no self-excitation occurs, clearing the number of times of suspected self-excitation, and proceeding to determining whether the RSSI of the current frame is greater than the first threshold, in response to the difference being less than or equal to the second threshold; and
    proceeding to determining whether the difference between the input power of the next frame and the input power of the current frame is greater than the second threshold, in response to the number of times of suspected self-excitation being less than or equal to the third threshold.

3. The self-excitation detection method of claim 2, wherein in response to the number of times of suspected self-excitation being greater than the third threshold and the RSSI of the current frame being less than or equal to the first threshold, the self-excitation detection method further comprises:
    obtaining a first RSSI when a power amplifier of the receiving side is not turned off;
    turning off the power amplifier of the receiving side;
    obtaining a second RSSI when the power amplifier of the receiving side is turned off;
    determining whether an absolute value of a difference between the second RSSI and the first RSSI is greater than a fourth threshold;
    determining that self-excitation occurs and clearing the number of times of suspected self-excitation, in response to the absolute value of the difference being greater than the fourth threshold; and
    determining that no self-excitation occurs, clearing the number of times of suspected self-excitation, and proceeding to determining whether the RSSI of the current frame is greater than the first threshold, in response to the absolute value of the difference being less than or equal to the fourth threshold.

4. The self-excitation detection method of claim 1, wherein based on a determination that no self-excitation occurs, the self-excitation detection method further comprises:
    turning on the transmitting side.

5. The self-excitation detection method of claim 1, wherein the receiving side comprises an outdoor antenna, and the transmitting side comprises an indoor antenna.

6. The self-excitation detection method of claim 1, wherein the wireless-signal relay amplification device comprises at least one of a repeater and a microchamber.

7. An electronic device, coupled with a wireless-signal relay amplification device, the wireless-signal relay amplification device comprising a receiving side, a baseband side, and a transmitting side, the electronic device comprising:
    a processor; and
    a memory, coupled with the processor, and storing computer programs which are operable with the processor to:
        turn off the transmitting side when a wireless signal is received at the receiving side;
        determine whether a first input power of a wireless signal detected by the receiving side is the same as a second input power of a wireless signal detected by the baseband side and transmitted to the transmitting side by the receiving side; and
        determine whether self-excitation occurs according to the wireless signal detected by the baseband side, in response to the first input power being different from the second input power.

8. The electronic device of claim 7, wherein the processor configured to determine whether self-excitation occurs according to the wireless signal detected by the baseband side is configured to:
    determine whether a received signal strength indication (RSSI) of a current frame is greater than a first threshold;
    determine whether a difference between an input power of a next frame and an input power of the current frame is greater than a second threshold, in response to the RSSI of the current frame being greater than the first threshold;
    increase the number of times of suspected self-excitation by 1 and determine whether the number of times of suspected self-excitation is greater than a third threshold, in response to the difference being greater than the second threshold, wherein an initial value of the number of times of suspected self-excitation is 0;
    determine whether the RSSI of the current frame is greater than the first threshold, in response to the number of times of suspected self-excitation being greater than the third threshold;
    determine that self-excitation occurs and clear the number of times of suspected self-excitation, in response to the number of times of suspected self-excitation being greater than the third threshold and the RSSI of the current frame being greater than the first threshold;

determine that no self-excitation occurs, clear the number of times of suspected self-excitation, and proceed to determining whether the RSSI of the current frame is greater than the first threshold, in response to the difference being less than or equal to the second threshold; and proceed to determining whether the difference between the input power of the next frame and the input power of the current frame is greater than the second threshold, in response to the number of times of suspected self-excitation being less than or equal to the third threshold.

9. The electronic device of claim 8, wherein the processor is further configured to:

in response to the number of times of suspected self-excitation being greater than the third threshold and the RSSI of the current frame being less than or equal to the first threshold, obtain a first RSSI when a power amplifier of the receiving side is not turned off;

turn off the power amplifier of the receiving side;

obtain a second RSSI when the power amplifier of the receiving side is turned off;

determine whether an absolute value of a difference between the second RSSI and the first RSSI is greater than a fourth threshold;

determine that self-excitation occurs and clear the number of times of suspected self-excitation, in response to the absolute value of the difference being greater than the fourth threshold; and determine that no self-excitation occurs, clear the number of times of suspected self-excitation, and proceed to determining whether the RSSI of the current frame is greater than the first threshold, in response to the absolute value of the difference being less than or equal to the fourth threshold.

10. The electronic device of claim 7, wherein the processor is further configured to:

turn on the transmitting side based on a determination that no self-excitation occurs.

11. The electronic device of claim 7, wherein the receiving side comprises an outdoor antenna, and the transmitting side comprises an indoor antenna.

12. The electronic device of claim 7, wherein the wireless-signal relay amplification device comprises at least one of a repeater and a microchamber.

13. A non-transitory computer-readable storage medium storing computer programs which, when executed by a processor, cause the processor to carry out actions, comprising:

turning off a transmitting side of a wireless-signal relay amplification device when a wireless signal is received at a receiving side of the wireless-signal relay amplification device;

determining whether a first input power of a wireless signal detected by the receiving side is the same as a second input power of a wireless signal detected by a baseband side of the wireless-signal relay amplification device and transmitted to the transmitting side by the receiving side; and determining whether self-excitation occurs according to the wireless signal detected by the baseband side, in response to the first input power being different from the second input power.

14. The non-transitory computer-readable storage medium of claim 13, wherein the computer programs executed by the processor to carry out the action of determining whether self-excitation occurs according to the wireless signal detected by the baseband side are executed by the processor to carry out actions, comprising:

determining whether a received signal strength indication (RSSI) of a current frame is greater than a first threshold;

determining whether a difference between an input power of a next frame and an input power of the current frame is greater than a second threshold, in response to the RSSI of the current frame being greater than the first threshold;

increasing the number of times of suspected self-excitation by 1 and determining whether the number of times of suspected self-excitation is greater than a third threshold, in response to the difference being greater than the second threshold, wherein an initial value of the number of times of suspected self-excitation is 0;

determining whether the RSSI of the current frame is greater than the first threshold, in response to the number of times of suspected self-excitation being greater than the third threshold;

determining that self-excitation occurs and clearing the number of times of suspected self-excitation, in response to the number of times of suspected self-excitation being greater than the third threshold and the RSSI of the current frame being greater than the first threshold;

determining that no self-excitation occurs, clearing the number of times of suspected self-excitation, and proceeding to determining whether the RSSI of the current frame is greater than the first threshold, in response to the difference being less than or equal to the second threshold; and proceeding to determining whether the difference between the input power of the next frame and the input power of the current frame is greater than the second threshold, in response to the number of times of suspected self-excitation being less than or equal to the third threshold.

15. The non-transitory computer-readable storage medium of claim 14, wherein the computer programs are further executed by the processor to carry out actions, comprising:

in response to the number of times of suspected self-excitation being greater than the third threshold and the RSSI of the current frame being less than or equal to the first threshold, obtaining a first RSSI when a power amplifier of the receiving side is not turned off;

turning off the power amplifier of the receiving side;

obtaining a second RSSI when the power amplifier of the receiving side is turned off;

determining whether an absolute value of a difference between the second RSSI and the first RSSI is greater than a fourth threshold;

determining that self-excitation occurs and clearing the number of times of suspected self-excitation, in response to the absolute value of the difference being greater than the fourth threshold; and determining that no self-excitation occurs, clearing the number of times of suspected self-excitation, and proceeding to determining whether the RSSI of the current frame is greater than the first threshold, in response to the absolute value of the difference being less than or equal to the fourth threshold.

16. The non-transitory computer-readable storage medium of claim 13, wherein the computer programs are further executed by the processor to carry out actions, comprising:

turning on the transmitting side based on a determination that no self-excitation occurs.

17. The non-transitory computer-readable storage medium of claim 13, wherein the receiving side comprises an outdoor antenna, and the transmitting side comprises an indoor antenna.

18. The non-transitory computer-readable storage medium of claim 13, wherein the wireless-signal relay amplification device comprises at least one of a repeater and a microchamber.

\* \* \* \* \*